United States Patent
Win-Hall

(10) Patent No.: US 9,687,115 B1
(45) Date of Patent: Jun. 27, 2017

(54) REPRESENTATIVE, CONTAMINANT AND TEMPERATURE PROTECTIVE FOOD COVER SET

(71) Applicant: Dorothy Mai Win-Hall, Tomball, TX (US)

(72) Inventor: Dorothy Mai Win-Hall, Tomball, TX (US)

( * ) Notice: Subject to any disclaimer, the term of this patent is extended or adjusted under 35 U.S.C. 154(b) by 0 days.

(21) Appl. No.: 15/065,611

(22) Filed: Mar. 9, 2016

(51) Int. Cl.
| A47G 23/04 | (2006.01) |
| A47G 19/26 | (2006.01) |
| A47J 47/02 | (2006.01) |
| A47G 19/02 | (2006.01) |
| B65D 25/10 | (2006.01) |

(52) U.S. Cl.
CPC ............ *A47J 47/02* (2013.01); *A47G 19/025* (2013.01); *B65D 25/108* (2013.01)

(58) Field of Classification Search
CPC ............ A47G 19/027; A47G 2400/061; A47G 21/007; A47G 19/26; A47G 2023/0691; B65D 43/022; B65D 2203/00; A47J 41/0044; F25D 2331/812; F25D 2303/0845; F25D 2331/804
USPC .................................. 62/457.6, 463
See application file for complete search history.

(56) References Cited

U.S. PATENT DOCUMENTS

| 3,418,139 | A | * | 12/1968 | Craig | B65D 11/02 206/216 |
| 3,476,287 | A | * | 11/1969 | Kinnavy | B65D 43/0216 220/797 |
| 4,206,845 | A | * | 6/1980 | Christian | A47G 19/26 206/508 |
| 7,288,745 | B2 | * | 10/2007 | Colonna | F25D 3/08 219/438 |
| 2008/0272019 | A1 | * | 11/2008 | Miller | B65D 81/365 206/457 |
| 2012/0085765 | A1 | * | 4/2012 | Lan | B65D 43/022 220/378 |

FOREIGN PATENT DOCUMENTS

| DE | CH 314448 A | * | 6/1956 | ............... F25D 3/00 |
| DE | 2925499 A1 | * | 1/1981 | ............. A47G 19/26 |
| DE | EP 0153975 A1 | * | 9/1985 | ............. B65D 81/18 |
| NL | 1007936 C2 | * | 7/1999 | ............... F25D 3/08 |

* cited by examiner

*Primary Examiner* — J. Gregory Pickett
*Assistant Examiner* — Allan Stevens

(57) ABSTRACT

A novel food serving and storage set including cover formed to be similar to and of realistic size, shape and color for the food in which it is covering, an accompanying complimentary receiving unit that has a vertical raised lip around its edge for the cover to fit exactly on top. The receiving unit has a flat peripheral area surrounding a depression in its center on which food may rest directly or indirectly. The food can rest on a separate removable disc which fits on top of the receiving unit in order to separate any elements in the receiving unit's depression (e.g. a cooling or warming element) from the food. Attached to the lower outer and upper inner rims of the cover and receiving unit respectively is a non-slip lining that creates an airtight seal allowing this system to store food for an extended time.

5 Claims, 3 Drawing Sheets

REPRESENTATIVE, CONTAMINANT AND TEMPERATURE PROTECTIVE FOOD COVER SET

CROSS REFERENCE TO RELATED APPLICATIONS

Not applicable

BACKGROUND OF THE INVENTION

1. Field of the Invention

The invention relates generally to food covers and accompanying receiving units, such as platters or dishes or bowls whose purposes are typically to serve food as well as to keep environmental contaminants off the food concealed beneath the lid, as well as retaining moisture and some degree of warm or cool temperature within.

2. Description of the Prior Art

Although traditional food covers can claim similar advantages of use for their cover designs, such as protecting the underlying food from the environmental elements (U.S. Pub. No.2009/0181335 A1 & 2009/0053663 A1, Int'l Pub. No. CN87205589 U) and some temperature retention (U.S. Pat. No. 4,605,579), all the current covers do not provide a tight enough seal to the environment and are generally of an unappetizing, generic, geometric flattened funnel, cylindrical, rectangular or inverted basket-like shape and design. Additionally, they are either made of some opaque (e.g. metal, wood, ceramic or woven) material so that the user is unable to know what kind of food is underneath the cover until it is lifted or else the cover is made of a transparent material (e.g. clear plastic) which provides little temperature control protection and makes the food look overly sanitized and therefore the presentation of the food is less appetizing or aesthetically appealing. This invention is designed so that the outer shape and look of the cover looks like a delicious version of the food underneath, for example a block of cheese or a display of cocktail shrimp and so on and so on. By presenting and serving the food within this invention's cover and receiving unit, it not only allows the food to look appetizing, but it can also inform the consumer of its contents without the need for additional labeling or lifting of the cover thereby allowing the food to be kept on a table or dining area for a substantial length of time and continue to be preserved at the correct state for consumption. These qualities are lacking in all the current food covers to date.

BRIEF SUMMARY OF THE INVENTION

This invention is novel in its form and function by its ability to inform the user of what the food underneath the lid is without being transparent or labeled, but by being a close visual representation in size, shape and color of the food that lies beneath. In addition, the exact fit of the receiving unit, on which the food rests, is a custom fit to the overlying lid by way of having a significantly raised, vertical edging around the receiving unit to prevent the overlying lid from moving and slipping and thus providing a tight and enclosed fit for the lid which will help to keep the food contents warmer or cooler longer than without this element, until the food is consumed. This fit is further enhanced and ensured by way of a layer of non-slip material lining the inside of the vertical perimeter rim of the receiving unit which comes into contact with the cover which has a similar lining on its bottom, lower, outer edge which comes into contact with the receiving unit. This feature allows for an even tighter seal between the cover and the receiving unit which will further retard temperature (hot or cool) escape from the food within. Additionally it will prevent the introduction and/or absorption of other food/germs/moisture/chemicals to the food within the cover and receiving unit, therefore allowing the food to be preserved in the refrigerator as it's own food storage container. The whole unit would be made of ceramic, glass, plastic, rubber or any combination of these elements.

An additional feature to aid in the control of the food temperature between the cover and receiving unit is a depressed area or well in the center of the receiving unit which provides an area that can allow for a warming or cooling element, such as ice or a hot/cold pack, to rest. On top of the ice or hot/cold pack can be laid an additional flat disc of plastic, glass or rustproof metal so that food which needs to be kept cool for safe consumption (such as those containing dairy, raw animal protein or seafood) can be kept cool while sitting out of refrigeration on the platter until it is consumed.

The necessity of this type of invention is evident in the food warnings put forth by the U.S. government's Food Safety and Inspection Service which recommends that food not be left outside of refrigeration for more than 2 hours to remain safe to consume and that cold food should be kept cold by ". . . nesting dishes in bowls of ice . . . ". With a food cover and receiving unit like this invention, users may feel more comfortable with consuming food left outside of refrigeration for this period of time to be safer and more enjoyable to eat since it would have retained its temperature and cleanliness from environmental elements better. It may even extend the period of time cold food can be left out unrefrigerated since the ice or cold pack on the receiving unit can be refreshed to maintain a proper cool temperature. In addition, the lack of need for lifting the cover to see what kind of food is underneath is reduced, allowing reduction of environmental contaminants and temperature loss.

These features are principally the idea of the cover being molded and produced to look like the food for which it represents underneath, the non-slip material being at the contact points between the cover and receiving unit and the receiving unit having a significant vertical lip around the outer edging to prevent slipping of the cover resting on it and aiding in a tight seal between the two elements of the food serving/storage unit.

It must be emphasized that the drawings are illustrative only. Variations will exist as being part of the invention and limited only by the scope of the claims.

DETAILED DESCRIPTION OF THE INVENTION

In the following detailed description, because other shapes and representations are possible, the present invention should not be limited to the illustrated embodiments. One shape is chosen here for illustrative purposes only.

Figure 1:
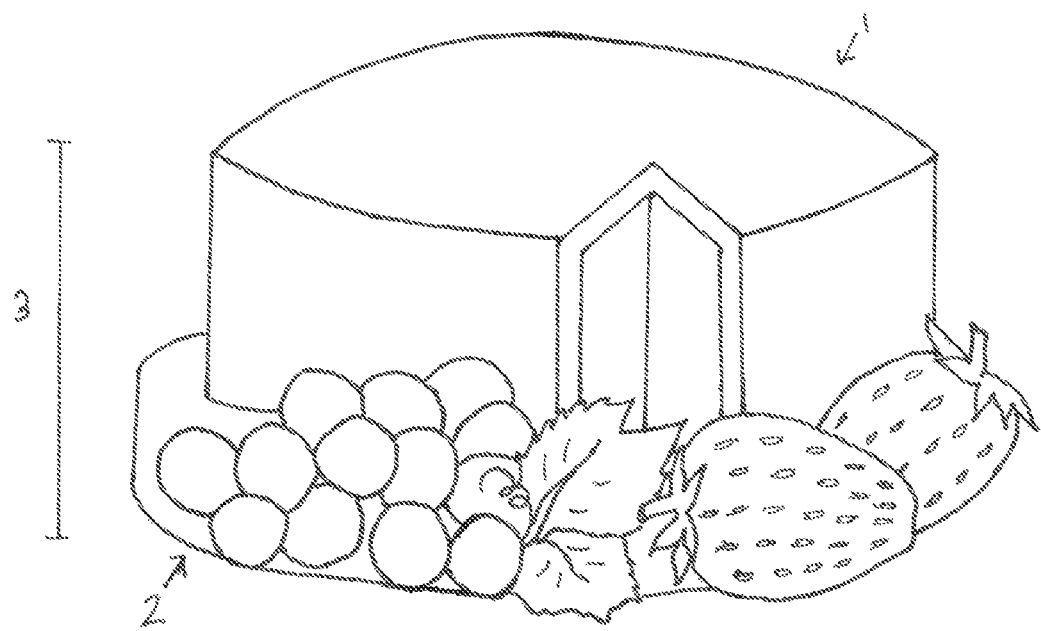
FIG. 1 is a diagrammatic perspective view of the representative food cover and receiving unit (in this case a dish). It shows an example of a type of food item that would be used with this invention and therefore its corresponding, representative shape in the cover (1) and dish (2). In this example the cover and dish are fitted together to not only resemble a delicious block of cheese and fruit, but actually encasing cheese and fruit as the unit would sit ready for serving them in a protective and cool mini environment.
Figure 2:
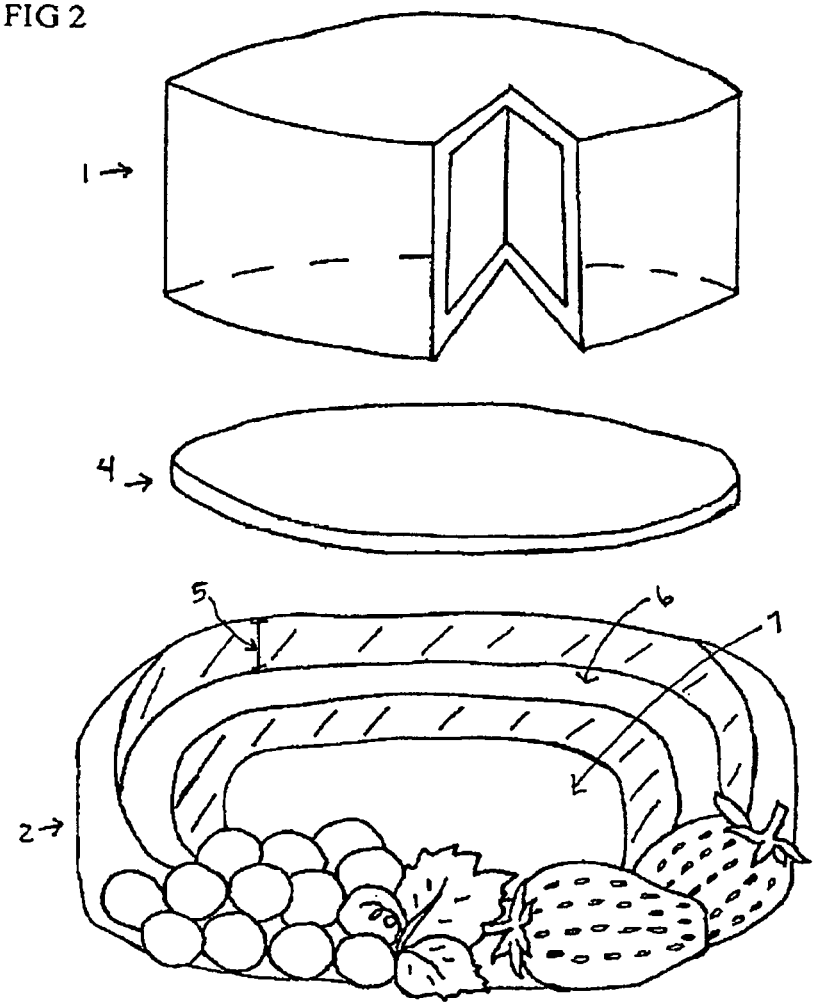
FIG. 2 is a diagrammatic perspective view in exploded form of the representative food cover (1), accompanying receiving unit (in this example a dish) (2) displaying the vertical lip (5) of the dish and the depression or well (7) that would hold a cooling agent such as ice or a hot/cold pack, and an additional disc (4) that would be laid on top of the flat peripheral portion (6) of the dish for the food item to sit on in order to prevent it from mixing with the cooling or warming agent below in the depression (7).

FIG. 2 illustrates the different parts of the representative food serving and storage unit (3); the food cover (1) and accompanying receiving unit (2) (in this example, a dish). This unit is unique and different from current food covers and serving trays, in that the cover and accompanying receiving unit is not of a generic inorganic shape, such a cylindrical or rectangular form, or a gross representation or decorative means such as an unrealistically large and "cartoon-like" image of a tomato or other food items, but is instead a true representation of the food item in its ideal prepared form for entertaining and consuming (e.g. cheese that is in an attractive state of being a fresh block drawn straight from when it was produced and stored and at the right temperature). The representation is so similar to an actual food item, that a person not knowing prior that the unit is not actually food, may mistake it as such. The shape is not only in the cover, but is also in the accompanying receiving unit underneath. The two parts fit together exactly not only due to their custom fit for their shape and size, but also for the cohesive image that they produce together. This allows for such a convincing representation of the food item that it is storing within, that the diner will know instantly what food they will be having and feel confident that the food item will be fresh and safe to eat.

Figure 3:
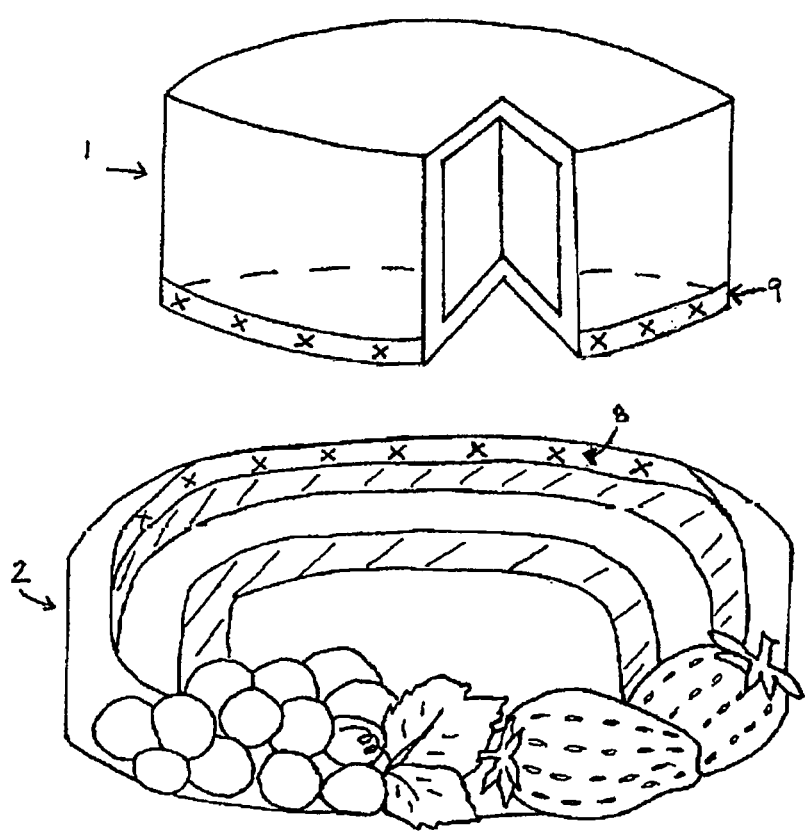
FIG. 3 is a diagrammatic perspective view of the food cover (1), accompanying receiving unit (in this example a dish) (2) and the non-slip lining on the inside (8) of the dish's vertical lip and the outside bottom edge (9) of the cover.

In addition, another unique feature to this unit as illustrated in FIG. 3 could be the non-slip lining that is on the inside (8) of the receiving unit's vertical lip (5) and on the outside bottom edge (9) of the cover. This lining is made of a non-slip rubber/silicone like substance that when rubbed or contacted, as when the lid and receiving unit are connected, would prevent the two parts from sliding easily and produce a good seal. This lining may be on one or the other part or both of the food cover and receiving unit system, but its purpose remains to be to prevent slipping of the two parts and producing a good seal to keep the two parts well together and preventing the escaping of smell, moisture or germs from the food within or entering of such elements from without. In this way, this unit is also unique in that in addition to being used for food serving, it can also be used to store food inside of a refrigerator.

Complimentary to this idea of food storage is the idea of food preservation without the use of chemicals, but by controlling the temperature in winch the food sits in the dining area before being consumed. Unlike current food covers or trays that are not well enclosed and allow for the escape of the ideal food temperature, whether warm or cool, and the introduction of air. moisture, dryness, contaminants from the environment to the exposed food, this invention being so well sealed keeps the temperature, within the unit, even and the food protected. One way is by the material in which the cover and receiving unit is made which would be of porcelain, ceramic, rubber, silicone or glass depending on which would be ideal for the type of food to be served. Another is the shape of the receiving unit. There is a flat peripheral portion (6) and a depression or well (7) in the center. This allows for a warm food item to be kept warm by the heat trapping nature of the material of the cover and receiving unit and also allows for a possible heat reflecting or retaining element (such as aluminum foil) be added to the flat peripheral portion surrounding the food or in the depression or well (7) underneath the food and with the additional disc (4) separating this heating element from the food. For cool food items that need to be kept cool to avoid spoilage and becoming toxic to the consumer such as cheese and dairy, seafood, raw meat or those containing raw eggs such as mayonnaise, this invention provides a solution for temperature control outside of refrigeration or electrical means. Ice or a cold pack can be placed in the depression of the receiving unit. As part of this system, the additional disc (4) that can be made of either plastic, glass or rust proof, food safe metal which is sized exactly to fit onto the receiving unit so that it is flush to the vertical lip and fully covering the depression and flat portion of the receiving unit below is used. This disc provides a barrier between the cooling agent (ice or cold pack) in the depression and the food which is resting on it.

By being a close shape, size and color to the actual food item in which this unit is storing, this invention is also better than the conventional food servers and storage units. Not only do you not have to open an opaque tray and leave it open to inform the diners of what the food is underneath the cover, and thereby allowing for environmental contaminants and reducing the proper temperature the food should be at, but you can also provide your table setting or dining area with an attractive view of the ideal form of food thereby producing a positive increase in the appeal and enjoyment of the meal. Transparent covers provide an artificial look to the food that looks overly sanitized and unappetizing (such as the previous covers mentioned in the prior art). Also, the food preparer can cook the food properly (e.g. meat products that should be cooked fully) without worry of the aesthetic look of the food since the representative cover always presents a realistic and idealized version of the food item.

The method for producing such a precise representation of the food item would use traditional and customary looks of the food items and a mold for that shape and size would be made. Then the cover and accompanying platter/dish/bowl would be made by pouring the chosen material (porcelain, ceramic, glass, silicone) into the mold. The exterior of the parts, such as the top of the cover and the outer vertical lip of the receiving unit, that would not contact the food directly would be covered with additional material that would produce the similar color and sheen of the food that it is supposed to resembles. This could be of a colored rubber or silicone or paint. Finally the non-slip lining(s) would be added as well.

In conclusion, herein is presented an invention for a representative, contaminant and temperature protective food cover set. This invention in concept and form, is described and illustrated by example in the drawing figures, and throughout the written description. It should be understood that numerous variations are possible to adapt the subtle parts and pieces of this invention since there are innumerable variations of food, while adhering to the inventive concept. These variations are contemplated as being a part of the present invention.

What is claimed is:

1. A food serving and storage unit comprising: a cover having a top wall, at least one sidewall depending from the top wall along its periphery, and a wedge shaped indent in the at least one side wall and top wall such that the top wall and the at least one sidewall together define an interior volume; a receiving unit having a well at its center, a flat peripheral portion surrounding the well, and a vertical lip surrounding and extending upwardly from a periphery of the flat peripheral portion; and a disc which can be laid on top of the flat peripheral portion such that it fully covers the well, wherein the well has a base and a peripheral wall extending upwardly from the base to the flat peripheral portion, wherein the well is capable of holding at least one warming or cooling element, and wherein a surface of an outside bottom edge of the at least one sidewall of the cover and a surface of an inside of the vertical lip contact each other in a fully engaged position of the cover and receiving unit and each of the surfaces have a layer of non-slip material which contact each other in the fully engaged position to produce a seal and prevent the cover and receiving unit from sliding easily.

2. The food serving and storage unit of claim 1, further comprising: the disc being made of plastic, glass, or rust proof metal.

3. The food serving and storage unit of claim 1, further comprising the receiving unit and cover being made from a material selected from the group of ceramic, glass, plastic, rubber, porcelain, and silicone.

4. The food serving and storage unit of claim 1, further comprising the disc being flush with the vertical lip of the receiving unit and fully covering the flat peripheral portion when laid on top of the flat peripheral portion.

5. The food serving and storage unit of claim 1, further comprising the non-slip material being a rubber or silicone like substance.

* * * * *